United States Patent
Miyagawa et al.

(10) Patent No.: US 9,836,258 B2
(45) Date of Patent: Dec. 5, 2017

(54) INFORMATION PROCESSING APPARATUS, CONTROL METHOD, AND NON-TRANSITORY COMPUTER-READABLE RECORDING MEDIUM

(71) Applicant: CANON KABUSHIKI KAISHA, Tokyo (JP)

(72) Inventors: Tomohiro Miyagawa, Shiki (JP); Hiroaki Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/156,799

(22) Filed: May 17, 2016

(65) Prior Publication Data

US 2016/0350038 A1 Dec. 1, 2016

(30) Foreign Application Priority Data

May 29, 2015 (JP) .................................. 2015-110385

(51) Int. Cl.
*G06F 3/12* (2006.01)
*H04N 1/00* (2006.01)
*G06K 15/02* (2006.01)
*H04L 29/08* (2006.01)

(52) U.S. Cl.
CPC ............ *G06F 3/1236* (2013.01); *G06F 3/121* (2013.01); *G06F 3/1229* (2013.01); *G06F 3/1232* (2013.01); *G06F 3/1285* (2013.01); *H04L 67/2842* (2013.01); *H04N 1/00204* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,246,848 B2* | 1/2016 | Nagatomo | H04L 49/357 |
| 2004/0243735 A1* | 12/2004 | Rosenbloom | G06F 9/4411 710/15 |
| 2005/0099962 A1* | 5/2005 | Matsuda | H04L 41/0253 370/254 |
| 2006/0020729 A1* | 1/2006 | Nakamura | H04L 12/40058 710/113 |

(Continued)

FOREIGN PATENT DOCUMENTS

JP 2006-048155 A 2/2006

*Primary Examiner* — Beniyam Menberu
(74) *Attorney, Agent, or Firm* — Canon USA Inc., IP Division

(57) ABSTRACT

A problem is solved by providing an information processing apparatus having a processing unit for performing processing based on device information acquired by acquisition processing performed at a time of connection with an external device, when performing the processing based on the device information is determined and the information processing apparatus is connected to the external device by a first connection method, and performing the processing based on the device information acquired by the acquisition processing performed after performing the processing based on the device information is determined, when performing the processing based on the device information is determined and the information processing apparatus is connected to the external device by a second connection method.

15 Claims, 10 Drawing Sheets

(56) References Cited

U.S. PATENT DOCUMENTS

| | | | | |
|---|---|---|---|---|
| 2006/0218272 A1* | 9/2006 | Murakami | ............ | G06F 3/1204 709/224 |
| 2007/0220181 A1* | 9/2007 | Jung | .................... | G06F 13/122 710/8 |
| 2008/0180531 A1* | 7/2008 | Sekiguchi | .......... | H04N 1/00278 348/207.2 |
| 2009/0002757 A1* | 1/2009 | Kitahara | ............... | G06F 3/1209 358/1.15 |
| 2009/0094604 A1* | 4/2009 | Sakai | .................... | G06F 3/1204 718/1 |
| 2010/0332692 A1* | 12/2010 | Nakajima | .......... | H04N 1/00127 710/19 |
| 2011/0188064 A1* | 8/2011 | Awata | ........................ | G06F 3/12 358/1.13 |
| 2012/0050798 A1* | 3/2012 | Abe | ...................... | G06F 3/1207 358/1.15 |
| 2013/0154904 A1* | 6/2013 | Sasaki | ........................ | G06F 3/14 345/1.1 |
| 2013/0172049 A1* | 7/2013 | Duong | ................... | H04B 15/00 455/559 |
| 2016/0077982 A1* | 3/2016 | Ding | ..................... | G06F 13/102 710/313 |
| 2016/0231965 A1* | 8/2016 | Tsujii | .................... | G06F 3/1206 |

\* cited by examiner

FIG. 10

```
<?xml version="1.0" encoding="utf-8" ?>
 <result>
  <status>ok</status>
 <device>
  <model>Printer123</model>
  <serial_number>123456</serial_number>
  <silentmode>ON,OFF</silentmode>
  <queue>true</queue>
  <printquality>1,2,3,4,5</printquality>
  <paperize="a4">21000,29700</paperize>
  <optionhdd>support</optionhdd> |
 </device>
 </result>
```

INFORMATION PROCESSING APPARATUS, CONTROL METHOD, AND NON-TRANSITORY COMPUTER-READABLE RECORDING MEDIUM

BACKGROUND OF THE INVENTION

Field of the Invention

The present invention relates to an information processing apparatus, control method, and non-transitory computer-readable recording medium.

Description of the Related Art

Conventionally, an information processing apparatus is known, such as a personal computer (hereinafter referred to as PC), that is connected to an external device, such as a printer, and uses information that is acquired from the external device acquired by the connection. Acquiring the information from the external device imposes a load on both the information processing apparatus and the external device. Accordingly, the information processing apparatus typically takes the form of reducing frequency of the acquisition of the information on the external device, by storing the acquired information as cache information in a cache memory and using the cache information when using the information on the external device. However, while the form of using the cache information in this way may reduce the load of acquiring the information on the external device, this form causes a problem of possible use of information inconsistent with current accurate information on the external device. Therefore, Japanese Patent Application Laid-Open No. 2006-048155 discloses a technique of utilizing the cache information while avoiding inconsistency of information by switching whether to use the cache information for each category of the information.

However, Japanese Patent Application Laid-Open No. 2006-048155 does not take into consideration a state of the currently connected external device in determination whether to use the cache information. Such a drawback causes a problem that the technique disclosed in Japanese Patent Application Laid-Open No. 2006-048155 possibly allows processing for using the cache information even though the cache information is not valid.

SUMMARY OF THE INVENTION

An object of the present invention is to provide an information processing apparatus, control method, and program that allow appropriate use of cache information.

Therefore, in order to achieve the aforementioned object, a non-transitory computer-readable recording medium according to the present invention, stores instructions that, when executed by a central processing unit, an information processing apparatus, the information processing apparatus being connectable to an external device by one of a first connection method for performing acquisition processing for acquiring the device information at a time of connection with the external device, and a second connection method for not performing the acquisition processing at the time of connection with the external device but for performing the acquisition processing with timing different from the time of connection, to execute a control method, the control method including:

determining to perform processing based on device information related to an external device;

performing the processing based on the device information acquired by the acquisition processing performed at the time of connection with the external device, when performing the processing based on the device information is determined and the information processing apparatus is connected to the external device by the first connection method; and performing the processing based on the device information acquired by the acquisition processing performed after performing the processing based on the device information is determined, when performing the processing based on the device information is determined and the information processing apparatus is connected to the external device by the second connection method.

Further features of the present invention will become apparent from the following description of exemplary embodiments (with reference to the attached drawings).

BRIEF DESCRIPTION OF THE DRAWINGS

FIG. 10 is an example of description of the ability information to be handled by the information processing apparatus according to the present embodiment.

DESCRIPTION OF THE EMBODIMENTS

Preferred embodiments of the present invention will be described below by way of example with reference to the drawings. However, regarding the present invention, it should be appreciated that, based on ordinary skill of a person skilled in the art, embodiments to which changes or improvements are added as needed to the following embodiment also fall within the scope of the present invention, without departing from the spirit of the invention.

First Embodiment

The following describes an information processing apparatus to which the present invention is applied, and an external device to be connected to the information processing apparatus to which the present invention is applied. The present embodiment illustrates a personal computer (hereinafter referred to as PC) as the information processing apparatus. Here, not only the PC but also various devices are applicable to the information processing apparatus, such as an image processing apparatus, mobile terminal, smart phone, notebook PC, tablet terminal, PDA (Personal Digital Assistant), and digital camera. In addition, as the external device to be connected to the information processing apparatus to which the present invention is applied, an inkjet type printer capable of communicating with the information processing apparatus is illustrated. In addition to these devices, as the external device, an image processing apparatus other than the inkjet type printer, PC, mobile terminal, smart phone, tablet terminal, PDA, digital camera, television, scanner, and other devices may be used. In addition, examples of the image processing apparatus other than the inkjet type printer include devices such as a full color laser beam printer, monochrome printer, copying machine, and facsimile machine. Furthermore, those devices may be multifunctional or may be single functional.

Figure 1:
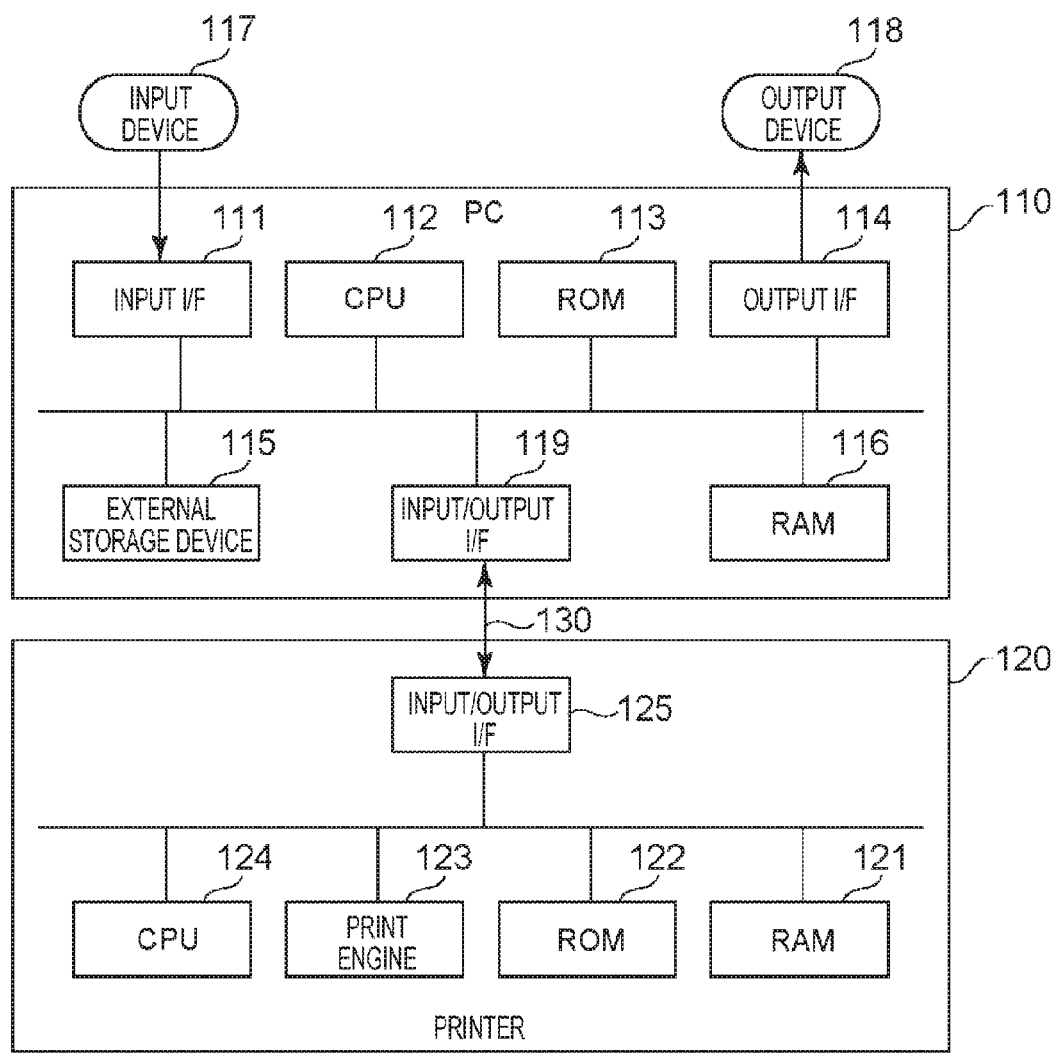
FIG. 1 is a block diagram illustrating a configuration of a communication system including an information processing apparatus and an external device according to the present embodiment.

The following describes a configuration of a communication system including the information processing apparatus according to the present embodiment and the external device according to the present embodiment, with reference to a block diagram of FIG. 1. Although the present embodiment describes the following configuration as an example, the present embodiment is applicable to an information processing apparatus capable of communicating with an external device, and functions are not particularly limited to this diagram.

A PC 110 is the information processing apparatus according to the present embodiment. The PC 110 includes an input I/F 111, CPU 112, ROM 113, output I/F 114, external storage device 115, RAM 116, input device 117, output device 118, and input/output I/F 119.

The CPU 112 is a system control unit and controls the PC 110 as a whole.

The ROM 113 stores constant data such as a control program to be executed by the CPU 112 and a data table.

The external storage device 115 stores an operating system (hereinafter referred to as OS), printer driver, and various kinds of other data and software. In the present embodiment, as an example, it is assumed that Windows (registered trademark) is used as OS.

The RAM 116 is configured using a memory such as SRAM (Static Random Access Memory) that needs backup power supply, and data is retained with an unillustrated primary battery for data backup. The RAM 116 stores program control variables and other data that do not allow data deletion. The RAM 116 is also used as a work memory to be used by various programs stored in the ROM 113 or external storage device 115.

The input device 117 corresponds to an operation unit that receives operation from a user, and is configured using a numeral input key, mode setting key, determination key, cancel key, power key, and other keys. The input device 117 is connected to the input I/F 111. The input I/F 111 is an interface for receiving data input and operation instructions from a user via the input device 117. The output device 118 corresponds to a display unit that displays data and a state of the PC 110, and is configured using an LED (light emitting diode), LCD (liquid crystal display), and other display devices. The output device 118 is connected to the output I/F 114. The output I/F 114 is an interface for performing control to allow the output device 118 to display data and to notify the state of the PC 110. It is to be noted that the input device 117 and the output device 118 may have an identical configuration by performing display of information and reception of operation with an identical member.

The input/output I/F 119 is connected to an input/output I/F 125 via a connection interface 130. Connection between the input/output I/F 119 and the input/output I/F 125 enables bi-directional communication between the PC 110 and a printer 120. Here, the input/output I/F 119 corresponds to a port in the present embodiment. The port enables communication between devices each including the port by connecting the ports via the connection interface 130. Examples of a type of port include a network port for performing connection via a network, and a USB port for performing connection with a printer via USB. In connection via a network, the network port may be directly connected by wireless connection, and the network port may be connected via an access point installed on a wired network. In addition, connection via a network is performed, for example, by wired LAN or wireless LAN. Examples of a communication method for connection include Wi-Fi (Wireless Fidelity), Bluetooth (registered trademark), and NFC (Near Field Communication; ISO/IEC IS 18092). It is to be noted that the network port may be individually prepared according to each communication method and connection method. In the present embodiment, the PC 110 is connected to the printer 120 by using a port 1.

The connection interface 130, which is for example USB or LAN, is not limited to these examples. Communication may be directly performed by wireless communication, and communication may be performed via an access point installed on a wired network. Examples of the communication method include Wi-Fi (Wireless Fidelity), Bluetooth (registered trademark), and NFC (Near Field Communication; ISO/IEC IS 18092).

The printer 120 is the external device in the present embodiment. The printer 120 includes RAM 121, ROM 122, print engine 123, CPU 124, and input/output I/F 125.

The CPU 124 is a system control unit and controls the printer 120 as a whole.

The ROM 122 stores constant data such as a control program to be executed by the CPU 124 and data table.

The RAM 121 is configured using a memory such as SRAM (Static Random Access Memory) that needs backup power supply, and data is retained with an unillustrated primary battery for data backup. The RAM 121 stores program control variables and other data that do not allow data deletion. In addition, the RAM 121 is used as a work memory for the CPU 124, and is also used as a temporary storage buffer for received data.

The print engine 123 forms an image on a printing medium, such as paper, by using a recording material, such as ink, based on data stored in the RAM 121 and on a print job received from the PC 110. The print engine 123 then outputs printing results.

The input/output I/F 125 is connected to the input/output I/F 119 via the connection interface 130.

A configuration of software stored in the external storage device 115 will be described with reference to a block diagram of FIG. 2. Among components illustrated in FIG. 2, although components 202, 204, 205, and 206 are modules of OS, and components 203, 207, and 208 are modules of a printer driver, each component may be a module of either OS or printer driver. Processing to be executed by each component is implemented by the CPU 112 reading a program designed for each component from the external storage device 115, loading the program into the RAM 116, and executing the program. An application 201 is stored in the external storage device 115, and produces print data including drawing information including image information and character information, such as paid content for printing, and print setting information such as a paper size and layout. The print setting information returned from a UI module 203 via a print support function of OS 202 is added to the print data produced by the application 201. The print data is then temporarily stored as spool data 206 in a job queue 205 of a spooler 204. The spooler 204 has a job management function, and retains and manages the passed spool data 206 until the spooler 204 recognizes that transmission of the print job according to the spool data 206 is completed. Specifically, the spooler 204 manages information, for example, a size of the print job and a job name for each printer, and conveys the managed information to a status display application to display the information on the output device 118 and the like. In addition, in preparation for occurrence of an error such as paper-jamming, the spooler 204 may retain the job itself including the print data until completion of the job. Here, information on the spool data 206 stored in the job queue 205 may be referenced using a predetermined interface function, for example, via a graphics driver 207, UI module 203, and application 201. The spool data 206 is converted by the graphics driver 207 into a print command that may be interpreted by the printer 120, and then the print job is generated. The generated print job is transmitted from the spooler 204 to a language monitor 208. The language monitor 208 divides the print job into packets of a specific size, and transmits the packets one by one to the printer 120 via the input/output I/F 119 and the input/output I/F 125. At this time, a size of data to be transmitted at a time is instructed by the spooler 204. The spooler 204 executes the instructions issued by the application 201 and UI module 203. In addition, the language monitor 208 has a function to acquire information on the printer 120 or a state of the job provided to the printer 120. Here, examples of the job include a print job, scan job, and maintenance job. The PC 110 causes the printer 120 to perform processing such as print, scan, and maintenance according to the job, by transmitting the job to the printer 120.

Figure 3:
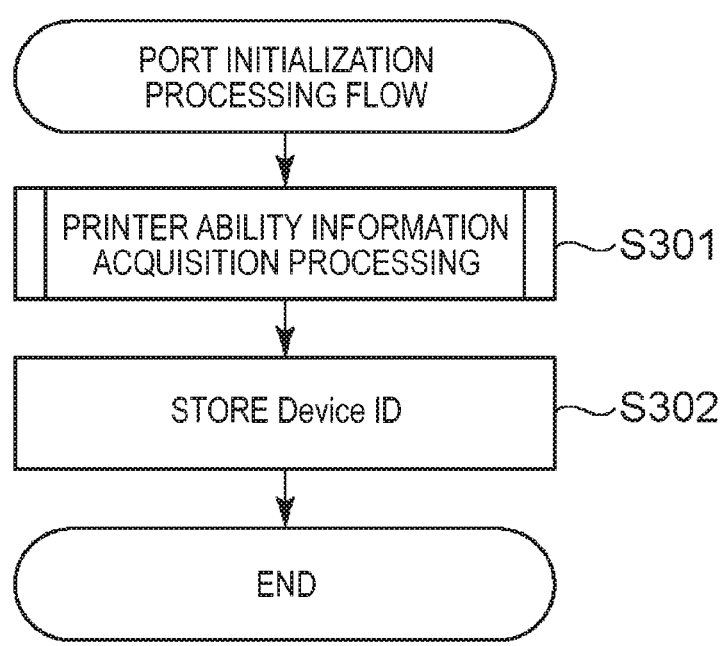
FIG. 3 is a flowchart illustrating port initialization processing to be performed by the information processing apparatus according to the present embodiment.

FIG. 3 is a flowchart illustrating port initialization processing according to the present embodiment. The port initialization processing refers to processing for the PC 110 acquiring ability information and device ID of the printer connected to the port included in the PC 110, and storing the acquired information in association with the port to initialize.

The ability information refers to information that indicates a setting state and capability of the printer. The ability information includes, for example, static information regarding the printer, such as a serial number of the printer, setting information on the printer, and information on functions supported by the printer. The ability information is described in XML data as illustrated in FIG. 10. In the XML data of FIG. 10, a status tag returns a result of response to an inquiry, and represents that an inquiry is successful in this example. A device tag represents basic information on the printer, and for example, a model tag represents a model name of the printer, and a serial number tag represents an identification number of the printer. A silentmode tag represents whether the printer supports a silent mode, and a queue tag represents whether the printer includes a job queue. The job queue is a component for queuing and retaining the job. The printer including the job queue can queue the received job in the job queue, and can process the job in order of queuing. A print quality tag represents a grace level of printing supported by the printer. A papersize tag represents a size of printing medium supported by the printer. An optional tag represents whether an optional device is supported. The optional device refers to a device detachable to the printer 120. Mounting the optional device to the printer 120 allows addition of a function corresponding to the optional device to the printer 120, and extension of conventional functions. Examples of the optional device for the printer 120 include an expansion memory, feed unit, and Bluetooth (registered trademark) unit. In addition, examples of an additionable/extensible function to the printer 120 include a type and number of sheets of retainable printing medium, Bluetooth (registered trademark) communication, and job queuing function.

In addition to such information, the ability information may represent information on whether the printer supports functions such as color printing, monochrome printing, double-side printing, edgeless printing, and scan function, and information on a print data format supported by the printer. In addition, these pieces of information may be expressed by a description method other than XML.

The device ID is information unique to the printer for identifying the printer, and for example, the device ID is a serial number.

The port initialization processing is performed, for example, when the OS starts, when the printer driver is installed, and when the printer connected to the PC 110 is connected again. In addition, the port initialization processing is performed when a job is transmitted to the printer, when UI of the printer driver is opened, and when the application 201 requests acquisition of the ability information on the printer. The port to undergo the port initialization processing is determined by an execution factor of the port initialization processing. For example, in a case where the port initialization processing is performed when the OS starts, the port initialization processing is performed on all the ports to which the printer is connected. In addition, in a case where the port initialization processing is performed when the printer connected to the PC 110 is connected again and when the job is transmitted to the printer, the port initialization processing is performed on the port to which the target printer for processing is connected.

In the following description, processing to be performed by the language monitor 208 is actually implemented by the CPU 112 executing a program corresponding to the language monitor 208 stored in the external storage device 115. In addition, in the following description, the port initialization processing is performed on the port 1.

First, in $S^{301}$, the language monitor 208 performs acquisition processing of the ability information on the printer (printer 120) connected to the port 1. Details of processing of S301 will be described later with reference to FIG. 4.

Subsequently in S302, the language monitor 208 acquires the device ID of the printer 120, and stores the device ID in a nonvolatile manner in the external storage device 115 in association with the ability information acquired in S301 and port 1. Here, the language monitor 208 can acquire the device ID, for example, by transmitting a command for acquiring the device ID to the printer 120.

Figure 4:
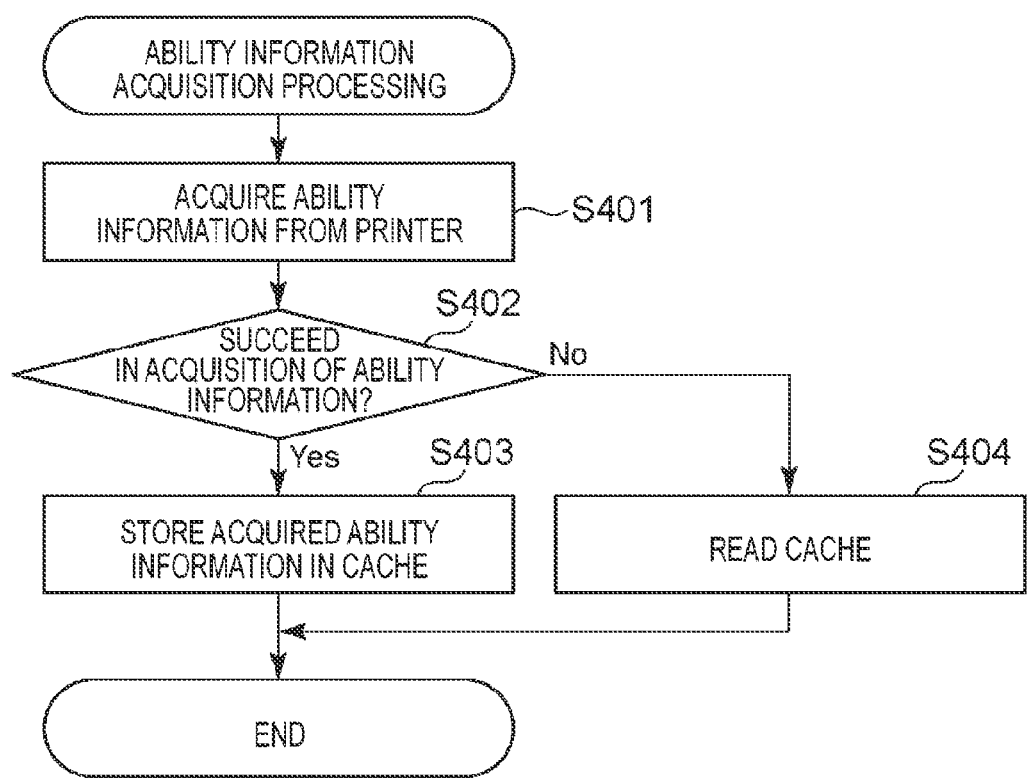
FIG. 4 is a flowchart illustrating acquisition processing of ability information to be performed by the information processing apparatus according to the present embodiment.

Next, details of the acquisition processing of the ability information will be described with reference to FIG. 4. FIG. 4 is a flowchart illustrating details of the acquisition processing of the ability information (S301 of FIG. 3). In the following description, processing to be performed by the language monitor 208 is actually implemented by the CPU 112 executing a program corresponding to the language monitor 208 stored in the external storage device 115. The target printer for the acquisition processing of the ability information is determined by an execution factor of the acquisition processing of the ability information. When performed during the port initialization processing, the acquisition processing of the ability information is performed on the printer connected to the target port for initialization. When performed during transmission of the job, which will be described later, the acquisition processing of the ability information is performed on the printer to which the job is to be transmitted. In addition, in the following description, the acquisition processing of the ability information is performed on the printer 120.

First, in S401, the language monitor 208 acquires the ability information on the printer 120. In the present embodiment, the language monitor 208 acquires the ability information on the printer 120 by transmitting unicast including XML data according to an ability information acquisition protocol to the printer 120, and by subsequently transmitting and receiving the XML data via TCP communication. At this time, the language monitor 208 also reads the ability information on the printer 120.

Subsequently, the language monitor 208 determines in S402 whether the language monitor 208 has succeeded in processing of S401 and has acquired the ability information. On determination that the language monitor 208 has acquired the ability information successfully, in S403, the language monitor 208 stores the acquired ability information as cache information in a nonvolatile manner in the external storage device 115 in association with the port (port 1) to which the printer 120 is connected. Subsequently, the language monitor 208 ends processing. On the other hand, on determination that the language monitor 208 has failed in acquisition of the ability information, due to data communication failure or the like, in S404, the language monitor 208 reads the ability information on the printer 120 from the cache information stored in association with the port 1. Subsequently, the language monitor 208 ends processing. It is to be noted that, even when reading of the cache information has failed, the language monitor 208 ends processing in a state where reading of the cache information has failed.

Figure 5:
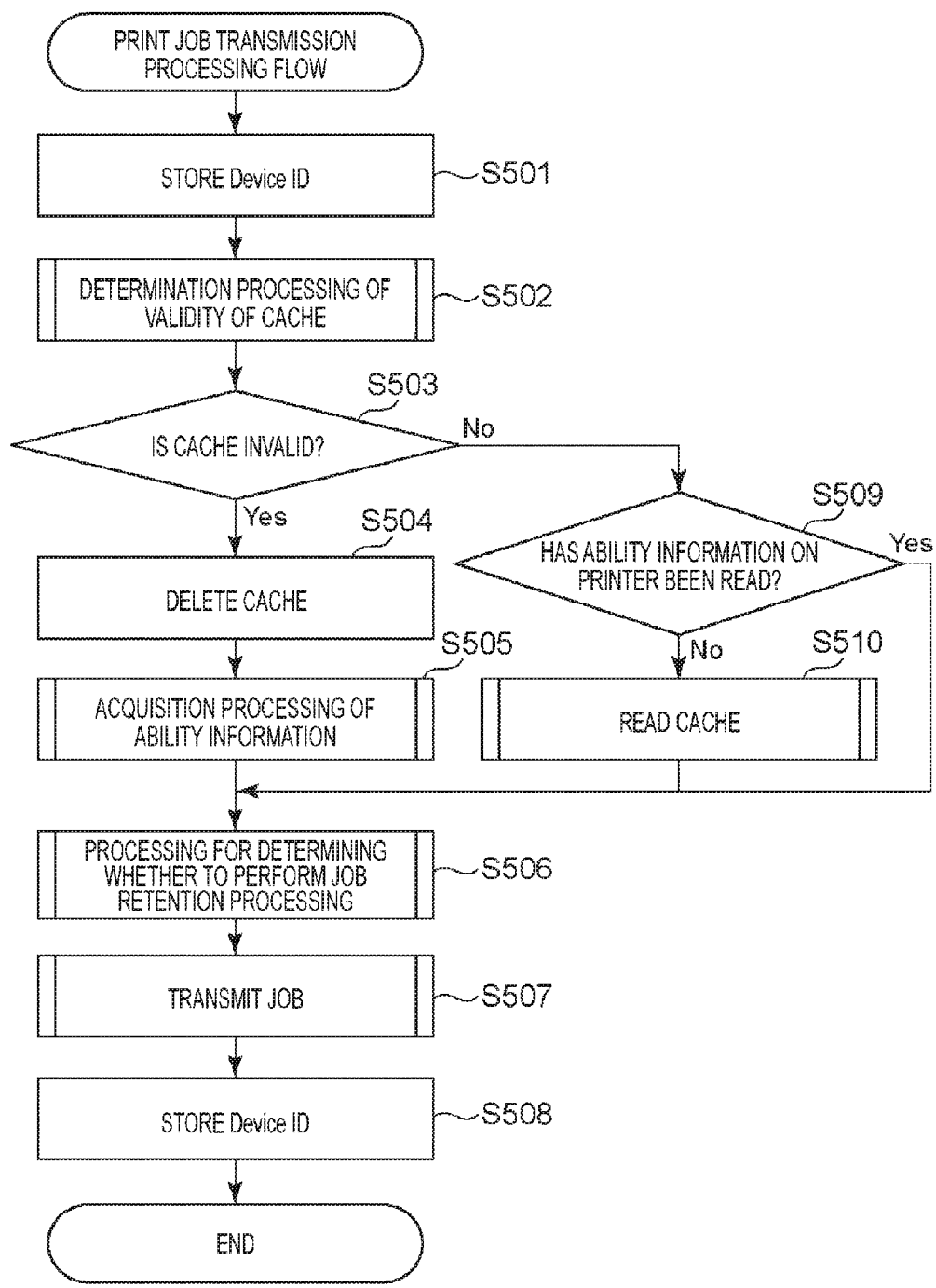
FIG. 5 is a flowchart illustrating processing at a time of transmission of a job to be performed by the information processing apparatus according to the present embodiment.

FIG. 5 is a flowchart illustrating processing at a time of job transmission. In the following description, processing to be performed by the language monitor 208 is actually implemented by the CPU 112 executing a program corresponding to the language monitor 208 stored in the external storage device 115. In addition, in the following description, processing illustrated in the flowchart of FIG. 5 is performed when the job is transmitted to the printer 120.

First, in S501, the language monitor 208 acquires the device ID of the printer 120, and stores the device ID of the printer 120 in a nonvolatile manner in the external storage device 115 in association with the port (port 1) to which the printer 120 is connected. At this time, the language monitor 208 does not delete but retains the device ID stored last time in association with the port 1, in order to use the device ID in processing of S502.

Subsequently in S502, the language monitor 208 performs processing for determining validity of the cache information on the ability information stored in a nonvolatile manner in the external storage device 115 in association with the port 1. Details of processing for determining the validity of the cache information will be described later with reference to FIG. 6.

Subsequently in S503, the language monitor 208 determines whether the cache information is determined to be valid as a result of processing of S502. On determination in S502 that the cache information is invalid, the language monitor 208, which should not reference the cache information, deletes the cache information in S504, and performs the acquisition processing of the ability information on the printer 120 in S505. The acquisition processing of the ability information of S505 is similar to the processing illustrated in the flowchart of FIG. 4, and thus description thereof is omitted. On determination in S502 that the cache information is valid, the language monitor 208 determines in S509 whether the ability information on the printer 120 has been read. For example, when the ability information on the printer 120 has already been read during the port initialization processing of the port 1, the language monitor 208 determines that the ability information on the printer 120 has been read, and performs processing of S506. On the other hand, when reading of the ability information on the printer 120 fails during the port initialization processing of the port 1, the language monitor 208 determines that the ability information on the printer 120 has not been read, and performs cache information reading processing of S510. Details of the cache information reading processing will be described later with reference to FIG. 7.

Subsequently in S506, the language monitor 208 performs processing for determining whether to perform job retention processing. The job retention processing refers to processing for leaving the job in the job queue 205 by notifying the spooler 204 that transmission of the job has not been completed, even if transmission of the job has actually been completed. By performing the job retention processing, the language monitor 208 can monitor a state of the job until the printer 120 completes processing of the job with a function of the language monitor 208. Specifically, as the state of the job, the language monitor 208 can monitor presence of errors in the job processing and whether the job processing has been completed. Here, details of processing for determining whether to perform the job retention processing will be described later with reference to FIG. 8.

Subsequently in S507, the language monitor 208 performs job transmission and job retention processing in accordance with a result of processing in S506. Details of the job transmission and job retention processing will be described later with reference to FIG. 9.

Subsequently in S508, the language monitor 208 stores the device ID of the printer 120 in a nonvolatile manner in the external storage device 115 in association with the port to which the printer 120 is connected, and then the language monitor 208 ends processing.

In recent years, printers that allow arbitrary customization of capability by mounting and demounting an optional device have been known. The ability information on such a printer that supports an optional device may change depending on mounting and demounting of the optional device. Therefore, when the currently connected printer supports an optional device, the ability information stored as cache information may be inconsistent with the current ability information on the printer, and thus the language monitor 208 should not use the cache information. In addition, when the printer connected to the PC 110 is replaced, the ability information stored in association with the port to which the printer is connected needs to be updated to the ability information on a newly connected printer. However, a port to which an external device is connected by a predetermined connection method cannot detect that the connected printer is replaced. Even when the connected printer is replaced, such a port fails to undergo the port initialization processing, and the ability information associated with the port is not updated. If the currently connected printer is connected to the port that cannot detect that the connected printer is replaced, the ability information stored in advance as cache information may be inconsistent with the current ability information on the printer. For this reason, the language monitor 208 should not use the cache information. Therefore, in the present embodiment, when performing processing for using the cache information on the ability information, the language monitor 208 first performs processing for determining whether the cache information is valid. On determination that the cache information is invalid, the language monitor 208 performs the acquisition processing of the ability information again.

Figure 6:
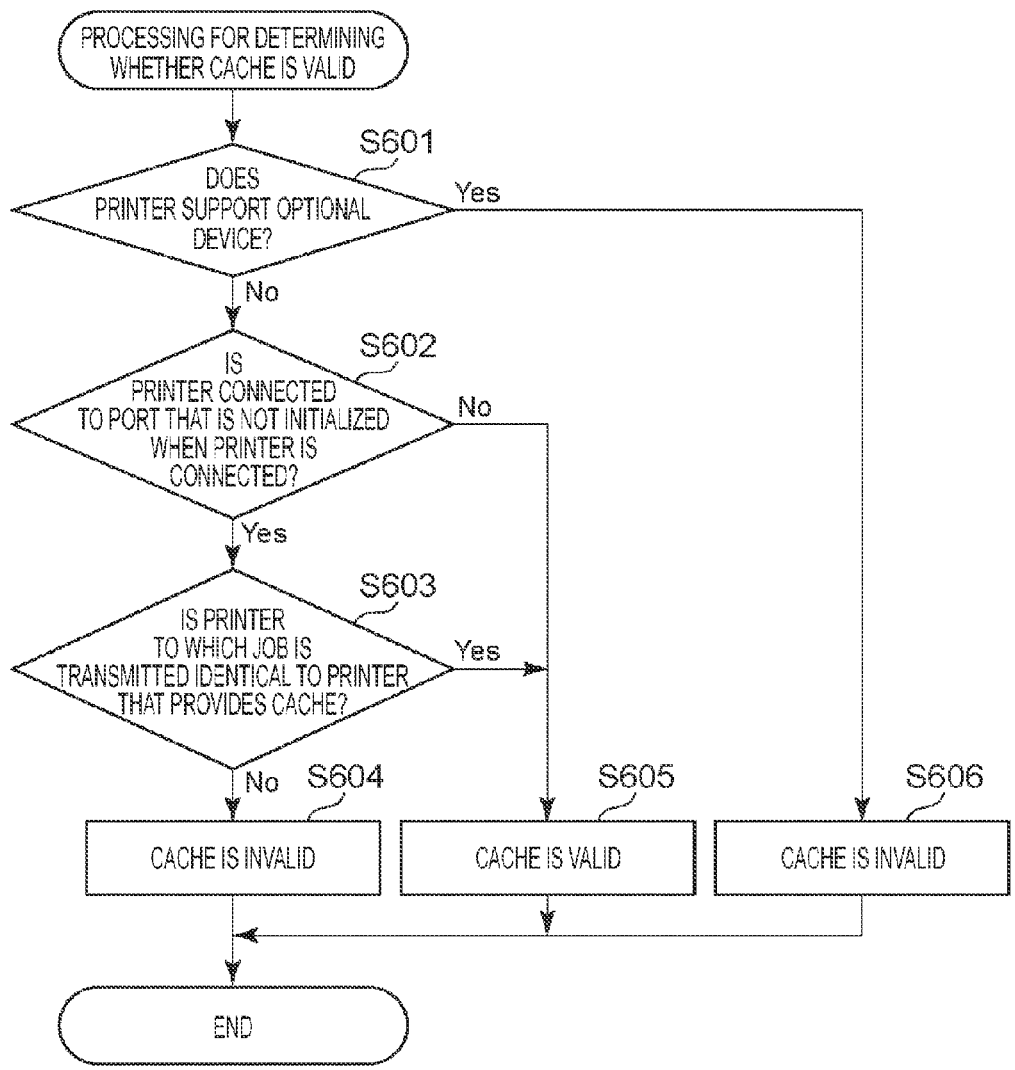
FIG. 6 is a flowchart illustrating processing for determining whether cache information is valid, to be performed by the information processing apparatus according to the present embodiment.

Details of processing for determining whether the cache information is valid will be described with reference to FIG. 6. In the following description, processing to be performed by the language monitor 208 is actually implemented by the CPU 112 executing a program corresponding to the language monitor 208 stored in the external storage device 115. In addition, in the following description, processing illustrated in the flowchart of FIG. 6 is performed when the job is transmitted to the printer 120.

First, in S601, the language monitor 208 determines whether the printer 120 supports an optional device, from the stored cache information on the ability information. On determination in S601 that the printer 120 supports an optional device, even if the ability information used for the determination is the ability information on the printer 120, the cache information should not be used. Thus, the language monitor 208 determines in S606 that the cache information is invalid. On the other hand, on determination in S601 that the printer 120 does not support an optional device, the language monitor 208 performs processing of S602.

In S602, the language monitor 208 determines whether the printer 120 is connected to a port that undergoes the port initialization processing when a printer is connected to the port. As described above, depending on a type of port, some ports fail to detect replacement of a connected printer. Even if the connected printer is replaced, such a port does not undergo the port initialization processing, and the ability information associated with the port is not updated. For example, a USB port can detect replacement of a connected printer and activates the port initialization processing when a printer is connected. In contrast, for example, a network port fails to detect replacement of a connected printer and fails to activate the port initialization processing when a printer is connected. If the printer 120 is connected to the port that activates the port initialization processing when a printer is connected, when the printer 120 is connected, the port initialization processing is performed, that is, the cache information is updated. Furthermore, the determination in S601 provides confirmation that mounting and demounting of an optional device does not change the ability information on the printer after the port initialization processing is performed. Therefore, on determination in S602 that the printer 120 is connected to the port that undergoes the port initialization processing, the language monitor 208 determines in S605 that the cache information is valid. On the other hand, on determination in S602 that the printer 120 is not connected to the port that undergoes the port initialization processing, the language monitor 208 performs processing of S603. Here, the determination in S602 is performed, for example, through determination whether the port (port 1) to which the printer 120 is connected is a USB port, after identification of a type of port to which the printer 120 is connected from a port name or module name of a port monitor. Alternatively, the determination in S602 may be performed through identification of which port the cache information is associated with for storage, and determination whether the port is a USB port.

When the printer 120 is not connected to the port that undergoes the port initialization processing when a printer is connected, the ability information stored as cache information may not be updated although the printer is replaced. Therefore, in S603, the language monitor 208 determines whether the printer 120 is identical to the printer that provides the ability information stored as cache information. On determination that the printers are not identical, the ability information stored as cache information is not updated, and thus it is necessary to newly acquire the ability information. Therefore, the language monitor 208 determines in S604 that the cache information is invalid. On the other hand, on determination that the printers are identical, the language monitor 208 determines in S605 that the cache information is valid. This determination is performed, for example, through a comparison made by the language monitor 208 between the device ID acquired just before in S501, and the device ID that has been stored before the acquisition in S501. The device ID acquired just before in S501 corresponds to the device ID of the printer 120. The device ID that has been stored before the acquisition in S501 corresponds to the device ID of the printer that provides the ability information stored as cache information. The language monitor 208 may perform this determination by comparing identification information that uniquely indicates the printer, such as a serial number of the printer, and a model name of the printer. In addition, the information including the serial number and the model name may be information included in the device ID.

The information processing apparatus may be configured not to perform processing of S603. In this case, although accuracy of the determination whether the cache information is valid decreases, it becomes unnecessary to perform processing of S501, and a load on the PC 110 may be reduced.

In the present embodiment, the language monitor 208 determines whether the cache information is valid, by determining whether the ability information on the printer to which the job is to be transmitted changes. Furthermore, in the present embodiment, the language monitor 208 determines whether the cache information is valid, by determining whether the printer to which the job is to be transmitted is identical to the printer that provides the ability information stored as cache information. Such a form allows the language monitor 208 to avoid using invalid information that is inconsistent with current information. Moreover, in the present embodiment, as illustrated in S504 and S505, when it is determined in processing illustrated in the flowchart of FIG. 6 that the cache information is invalid, the language monitor 208 performs the acquisition processing of the ability information. Such a form allows the language monitor 208 to acquire valid information again even when the cache information is invalid. Furthermore, in the present embodiment, the language monitor 208 does not perform the acquisition processing of the ability information when it is determined in processing illustrated in the flowchart of FIG. 6 that the cache information is valid. The acquisition processing of the ability information imposes a load on both the PC 110 and the printer that provide the ability information. However, by taking the form of not performing the acquisition processing of the ability information when the cache information is valid and the acquisition processing of the ability information is unnecessary as described above, the present embodiment allows reduction in the load on the PC 110 and the printer.

Processing for determining whether the cache information is valid may be applied not only to the information processing apparatus that transmits the job, but also to the information processing apparatus that performs various kinds of processing using the cache information regarding the connected external device. Examples of processing using the cache information include processing for notifying a user of a state of the external device connected to the information processing apparatus.

Figure 7:
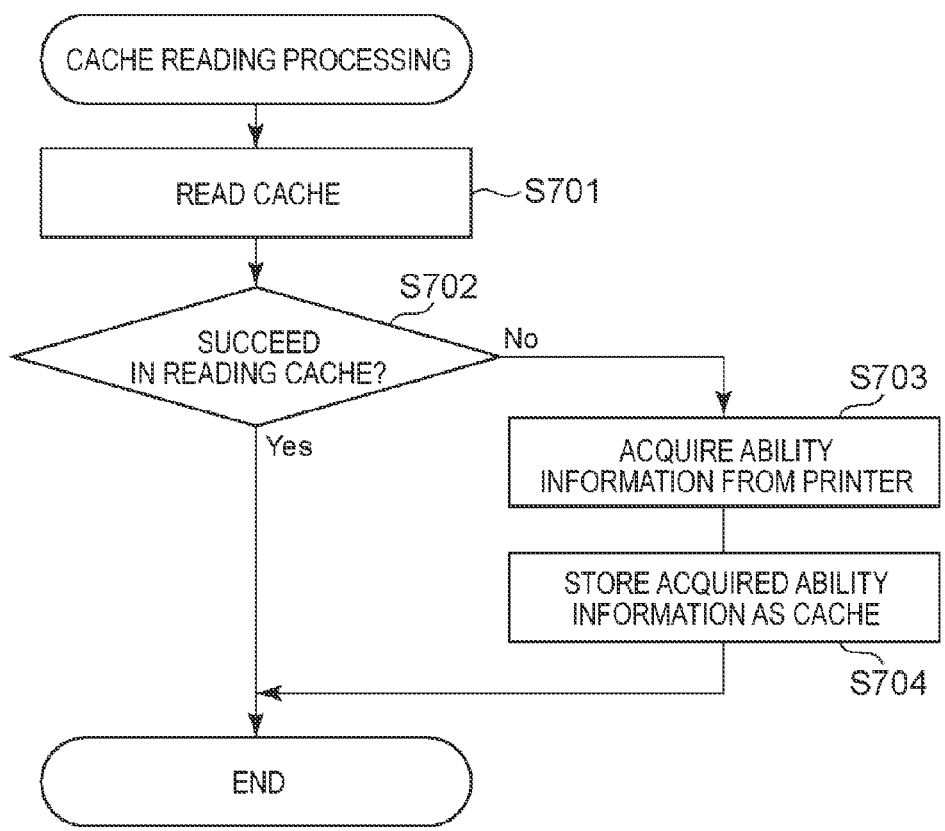
FIG. 7 is a flowchart illustrating cache information reading processing to be performed by the information processing apparatus according to the present embodiment.

Details of the cache information reading processing will be described with reference to FIG. 7. In the following description, processing to be performed by the language monitor 208 is actually implemented by the CPU 112 executing a program corresponding to the language monitor 208 stored in the external storage device 115. In addition, in the following description, processing illustrated in a flowchart of FIG. 7 is performed when the job is transmitted to the printer 120.

First, in S701, the language monitor 208 reads the cache information stored in association with the port (port 1) connected to the printer 120, the cache information being stored in the acquisition processing of the ability information. At this time, the language monitor 208 may fail in reading the cache information, for example, when the cache information is intentionally deleted by a user, and when generation of the cache information has never succeeded due to a reason such as a shortage of free space of the external storage device 115. Therefore, the language monitor 208 determines in S702 whether the language monitor 208 succeeds in reading the cache information. When the language monitor 208 succeeds in reading the cache information, the language monitor 208 ends the cache information reading processing. On the other hand, when the language monitor 208 fails in reading the cache information, the language monitor 208 acquires the ability information from the printer 120 in S703 in a similar manner to the aforementioned method. Subsequently in S704, the language monitor 208 stores the acquired ability information as cache information in a nonvolatile manner in association with the port 1.

Figure 8:
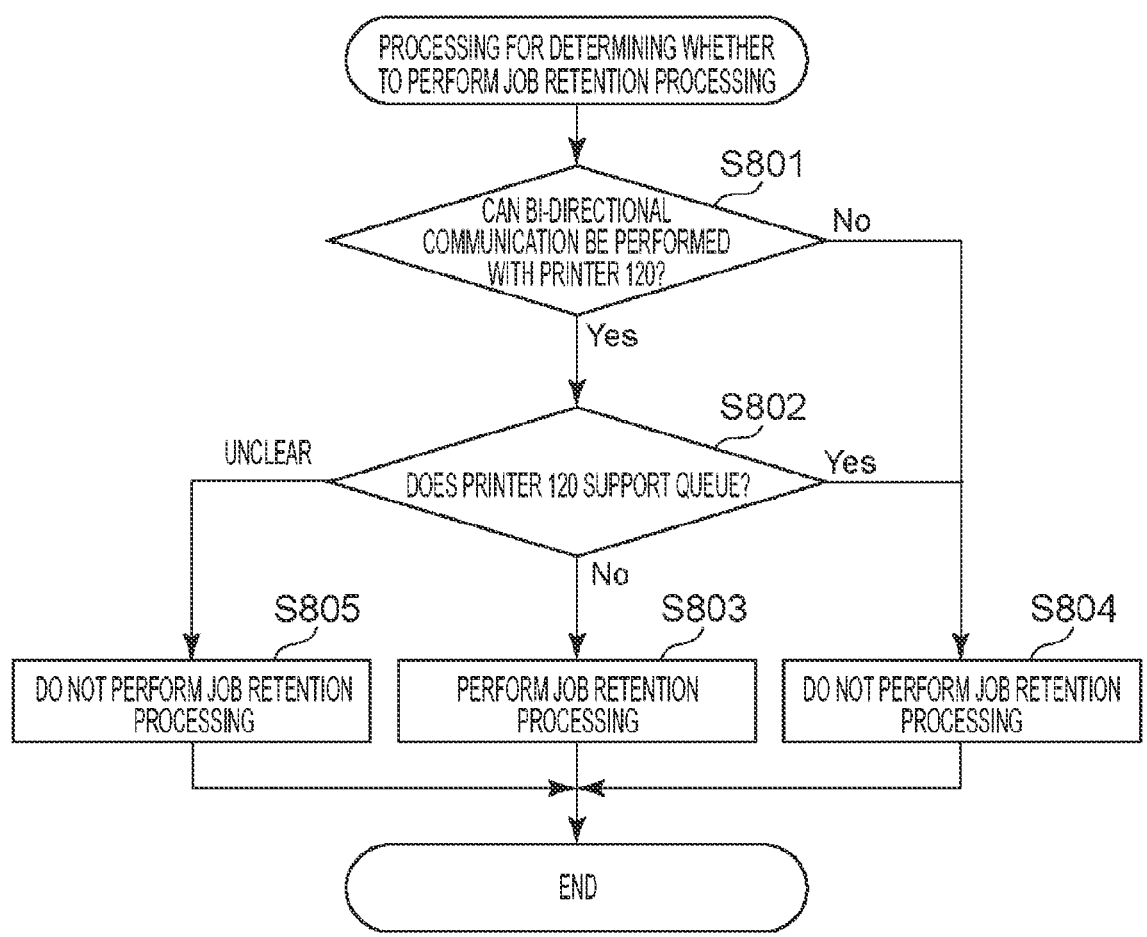
FIG. 8 is a flowchart illustrating processing for determining whether to perform job retention processing to be performed by the information processing apparatus according to the present embodiment.

Details of processing for determining whether to perform the job retention processing will be described with reference to FIG. 8. In the following description, processing to be performed by the language monitor 208 is actually implemented by the CPU 112 executing a program corresponding to the language monitor 208 stored in the external storage device 115. In addition, in the following description, processing illustrated in the flowchart of FIG. 8 is performed when the job is transmitted to the printer 120.

When the language monitor 208 fails to perform bi-directional communication with the printer 120, the language monitor 208 fails to monitor a state of the job. Therefore, the language monitor 208 first determines in S801 whether bi-directional communication may be performed with the printer 120. The determination of S801 is performed, for example, by the language monitor 208 determining whether the printer driver is configured to allow single-directional communication with the printer 120. Here, the determination of S801 may be performed by the language monitor 208 determining whether the port (port 1) to which the printer 120 is connected is supported by the language monitor 208. At this time, for example, the language monitor 208 determines whether the port name of the port 1 includes a predetermined character string that indicates the port supported by the language monitor 208. In addition, the determination of S801 may be performed by the language monitor 208 determining whether all information expected by the language monitor 208 has been acquired from the printer 120. Examples of the information expected by the language monitor 208 include residual quantity information on ink included in the printer 120 and destination information. On determination that the language monitor 208 can perform bi-directional communication, the language monitor 208 performs processing of S802. On determination that the language monitor 208 cannot perform bi-directional communication, in S804, the language monitor 208 determines not to perform the job retention processing.

In a case where a job is transmitted to a printer (a printer including a job queue) that queues the received job in the job queue and processes the job in the sequence of queuing, execution of the job retention processing may cause change in the sequence of job processing. Accordingly, when the printer 120 includes the job queue, the language monitor 208 should not perform the job retention processing. Therefore, the language monitor 208 determines in S802 whether the printer 120 supports the job queue (has a function to queue the job) with reference to the ability information on the printer 120 read in S504 or S505. On determination that the printer 120 includes the queue, the language monitor 208 determines in S804 not to perform the job retention processing. On the other hand, on determination that the printer 120 does not include the queue, the language monitor 208 determines in S803 to perform the job retention processing. At this time, the language monitor 208 may not be able to determine whether the printer 120 includes the queue, for example, when the ability information may not be acquired from the printer 120 due to network trouble and the like, and when the ability information does not include information on whether the printer 120 includes the queue. In this case, the language monitor 208 determines in S805 not to perform the job retention processing.

Thus, in the present embodiment, the language monitor 208 switches whether to perform the job retention processing according to whether the printer to which the job is transmitted includes the job queue. Furthermore, in the present embodiment, when it is unclear whether the printer to which the job is transmitted includes the job queue, the language monitor 208 does not perform the job retention processing. Such a form allows the language monitor 208 to avoid a problem that may be caused by execution of the job retention processing when the job is transmitted to the printer that includes the job queue, and the language monitor 208 can perform the job retention processing when appropriate. When processing of S502 is not performed, processing for determining whether to perform the job retention processing may be performed with reference to the cache information, and may be performed through the acquisition processing of the ability information just before, and with reference to the acquired ability information.

Figure 9:
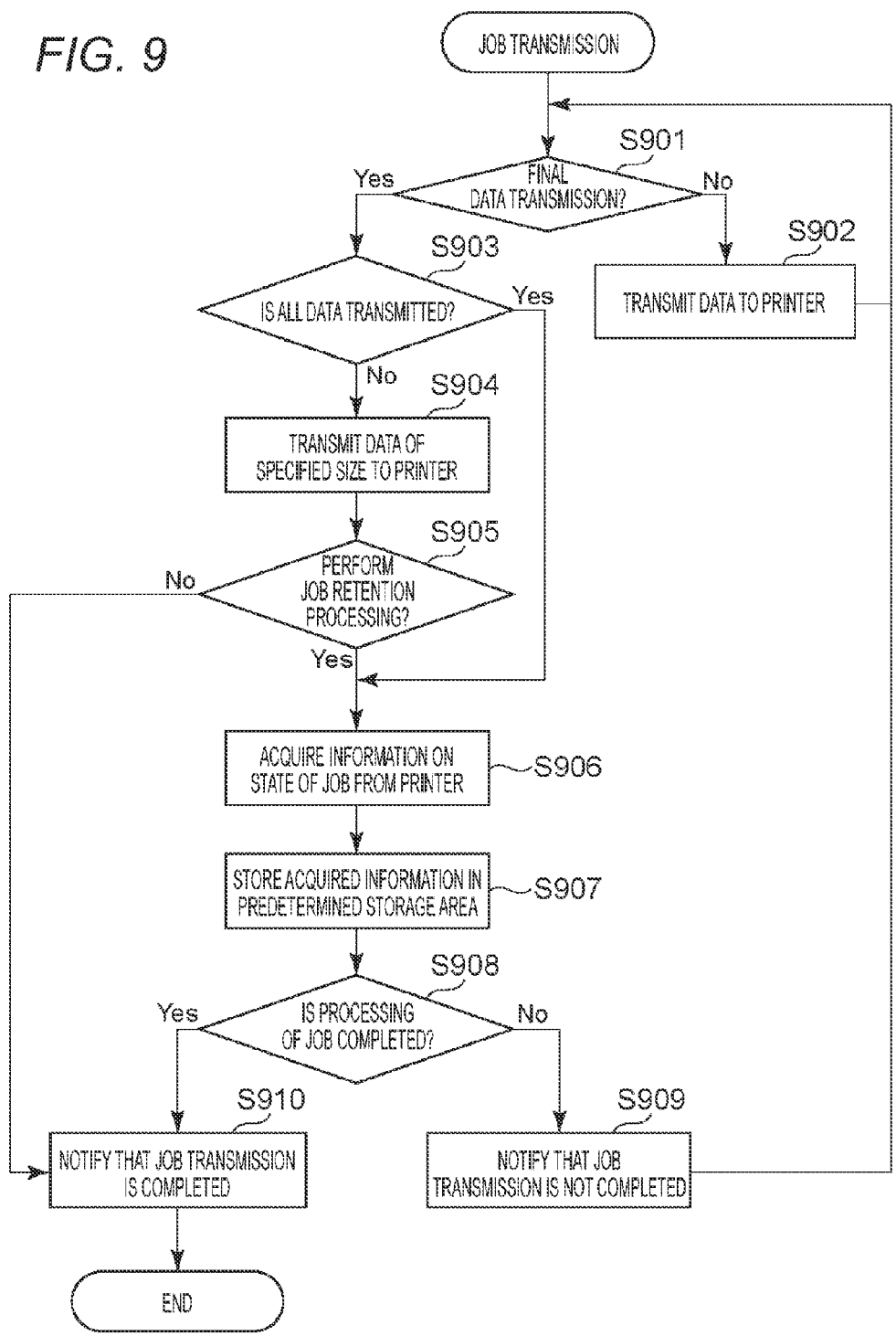
FIG. 9 is a flowchart illustrating the job retention processing to be performed by the information processing apparatus according to the present embodiment.

Details of job transmission processing and job retention processing will be described with reference to FIG. 9. In the following description, processing to be performed by the spooler 204 or language monitor 208 is actually implemented by the CPU 112 executing a program corresponding to the spooler 204 or language monitor 208 stored in the external storage device 115. In addition, in the following description, processing illustrated in a flowchart of FIG. 9 is performed when a command representing instructions to start job transmission to the printer 120 is output from the spooler 204 and the language monitor 208 receives the output. After that, data such as actual print data and a maintenance command will be output to the language monitor 208. The language monitor 208 receives, from the spooler 204, the command for instructing data transmission, and divides and transmits the job to the printer 120 by transmitting data of a size instructed by the command one by one.

First, the language monitor 208 determines in S901 whether the job transmission is the final data transmission for transmitting the job to the printer 120. The language monitor 208 can perform this determination processing by analyzing the command for instructing data transmission received from the spooler 204.

On determination that the job transmission is not the final data transmission, it is not necessary to perform the job retention processing yet. Thus, the language monitor 208 transmits data of the instructed size to the printer 120 in S902, and performs processing of S901 again.

On the other hand, on determination that the job transmission is the final data transmission after repeated processing of S901 to S902, the language monitor 208 determines in S903 whether all the job data has been transmitted. When the determination of S903 is performed for the first time, the final data transmission is not completed yet, and thus the language monitor 208 transmits the data of the instructed size to the printer 120 in S904.

Subsequently in S905, the language monitor 208 determines whether it is determined to perform the job retention processing in processing of S506. When it is not determined in processing of S506 to perform the job retention processing, the language monitor 208 notifies the spooler 204 in S910 that the job transmission is completed. On receipt of the notification from the language monitor 208, the spooler 204 stops managing the target job. Specifically, the spooler 204 deletes/invalidates the target job itself or information on the job from the job queue 205. On the other hand, when it is determined in processing of S506 to perform the job retention processing, the language monitor 208 acquires information on a state of the job from the printer 120 in S906.

Subsequently, the language monitor 208 writes the information acquired in S906 in a predetermined storage area in S907 so as to convey the information acquired in S906 to the status display application. The status display application may be the application 201 that requests printing, may be an application different from the application 201 that requests printing, and may be the UI module 203. The status display application displays the information acquired in S906 on the output device 118 and the like, and notifies a user of the information on the state of the job.

Subsequently, the language monitor 208 determines in S908 whether processing of the job is completed by the printer 120. The language monitor 208 performs this determination, for example, by acquiring, from the printer 120, a status that indicates a page number of data in printing. This status, which does not have a value (for example, zero) while printing is not being performed, allows the determination whether processing of the job is completed. On determination that processing of the job is not completed, the language monitor 208 notifies the spooler 204 in S909 that transmission of the job is not completed. The language monitor 208 performs this processing, for example, by returning a value of bytes smaller than a designated size to the spooler 204 as a return value to the command for instructing data transmission. The language monitor 208 usually returns an accurate number of bytes transmitted to the printer 120 as the return value. This allows the spooler 204 to recognize that transmission of the job is performed properly. However, the language monitor 208 causes the spooler 204 to recognize that transmission of the job is not properly performed, by returning the value of bytes smaller than the designated size as the return value to the spooler 204. The spooler 204, which recognizes that transmission of data is not completed, outputs an instruction again to transmit final data of bytes that is not output yet. However, since the language monitor 208 has already completed transmission of all the data (Yes in S903), the language monitor 208 does not perform actual data transmission to the printer 120, but can acquire the state of the job again (S906). Such a form allows the language monitor 208 to notify a user of the information on the state of the job while performing the job retention processing.

The language monitor 208 repeats processing of from S901 to S907, and in response to completion of the job processing of the printer 120 (YES in S908), the language monitor 208 notifies the spooler 204 that transmission of the job is completed. Specifically, the language monitor 208 replies the accurate value as the return value to the spooler 204. Such a form makes it possible to cause completion time of transmission of the job managed by the spooler 204 to almost coincide with completion time of processing of the actual job performed by the printer 120, and to notify a user of the completion time of the job processing.

As described above, the present embodiment switches whether to perform the job retention processing according to whether the destination printer includes the job queue. Such a form allows the PC 110 to perform the job retention processing when appropriate, and to increase user convenience.

Other Embodiments

Figure 2:
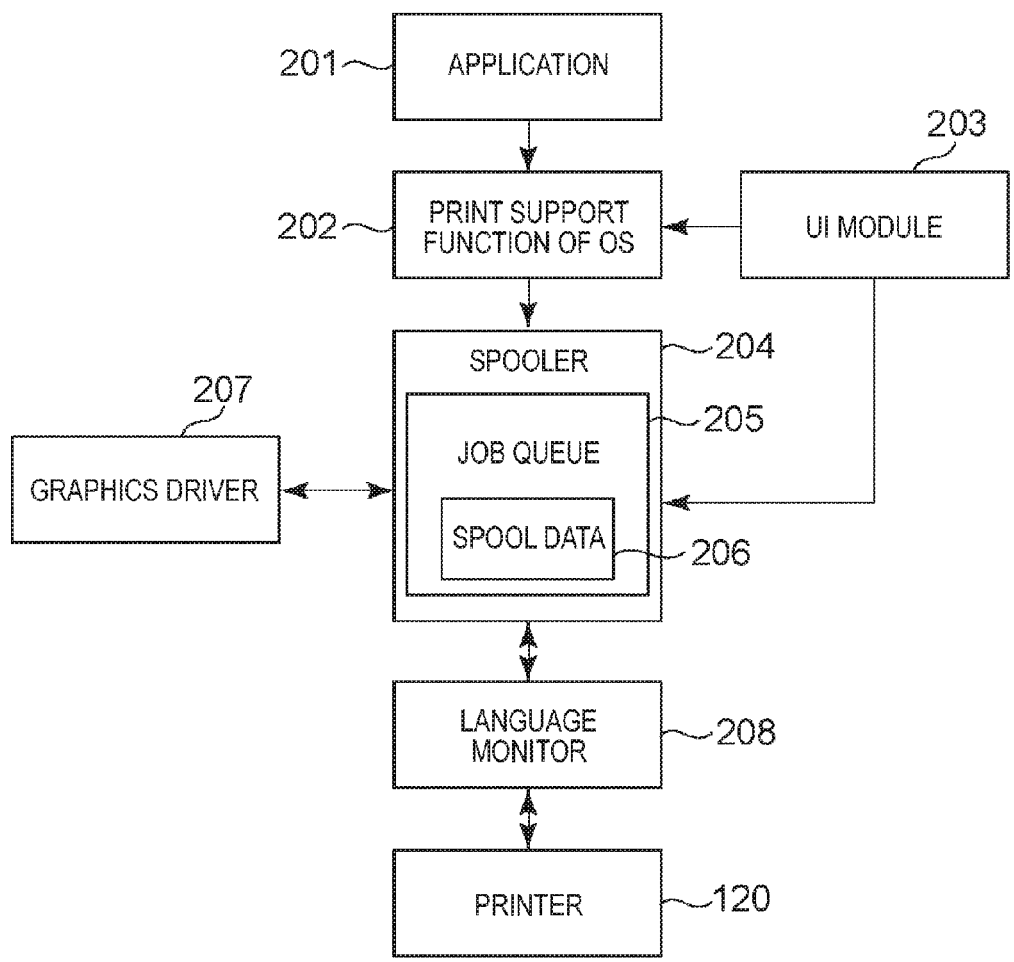
FIG. 2 is a conceptual diagram illustrating a configuration of a printer driver included in the information processing apparatus according to the present embodiment.

Although the aforementioned embodiment has described a form in which respective software modules installed in the PC 110 work together as illustrated in FIG. 2, a form to which the aforementioned form is applied may also be assumed. For example, the language monitor 208 may be installed in another PC. In this case, the language monitor 208 and the spooler 204 perform interprocess communication, which provides an effect similar to an effect of the aforementioned embodiment.

Although the aforementioned embodiment has described each of the software modules including the language monitor 208 and the spooler 204 separately, for example, one software module performed in one process may also provide an effect similar to the effect of the aforementioned embodiment.

The aforementioned embodiment has described a form using a Version 3 printer driver. In recent years, Windows (registered trademark) 8 has employed a printer driver configuration called a Version 4 printer driver, different from the Version 3 printer driver. A module group that constitutes the new printer driver does not include the language monitor. Therefore, in the Version 4 printer driver, a configuration called a filter may implement functions similar to the language monitor.

In the aforementioned determination whether to perform the job retention processing according to the embodiment, a type of job to transmit may be referenced. For example, determination may be made not to perform the job retention processing, when a maintenance job is transmitted for causing the printer 120 to perform operations such as power supply control processing for instructing ON or OFF of power supply for the printer 120, and operation mode setting processing of the printer 120 such as an operation sound mode.

As long as the effect of the aforementioned embodiment may be achieved, processing order of the aforementioned flowchart of the embodiment may be changed, all the processes do not need to be performed, and content of processing may be changed. For example, the language monitor 208 may not perform processing of S506, but may perform processing similar to processing of S506 in processing of S905.

The aforementioned embodiment may be implemented through processing for providing a program that implements one or more functions of the aforementioned embodiment to a system or apparatus via a network or storage medium, and executing the program by one or more processors in a computer of the system or apparatus. In addition, the aforementioned embodiment may also be implemented by a circuit (for example, ASIC) that implements one or more functions.

The information processing apparatus, control method, and program of the present invention allow appropriate use of cache information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-110385, filed May 29, 2015, which is hereby incorporated by reference herein in its entirety.

What is claimed is:

1. A non-transitory computer-readable recording medium storing a program that causes, when executed by at least one central processing unit, an information processing apparatus, the information processing apparatus being connectable to an external device by one of a first connection method and a second connection method different from the first connection method, and the information processing apparatus being capable of detecting that the information processing apparatus is newly connected to the external apparatus by the first connection method, by using the program, but incapable of detecting that the information processing apparatus is newly connected to the external apparatus by the second connection method, to execute a control method, the control method comprising:
    storing, in a memory, predetermined device information to be obtained from the external apparatus to which the information processing apparatus is connected;
    receiving an instruction for performing predetermined processing;
    performing determination processing for determining whether the information processing apparatus is already connected to the external apparatus by the first connection method or the information processing apparatus is already connected to the external apparatus by the second connection method; and
    performing the predetermined processing by using the predetermined device information,
    wherein the predetermined processing is performed either by using the predetermined device information that has been stored in the memory since before the instruction is received without obtaining the predetermined device information after the instruction is received or by using the predetermined device information to be obtained after the instruction is received without using the predetermined device information that has been stored in the memory since before the instruction is received, based on a determination result of the determination processing, and
    wherein the predetermined processing is performed by using the predetermined device information that has been stored in the memory since before the instruction is received without obtaining the predetermined device information after the instruction is received in a case where it is determined that the information processing apparatus is connected to the external apparatus by the first connection method, and the predetermined processing is performed by using the predetermined device information to be obtained after the instruction is received without using the predetermined device information that has been stored in the memory since before the instruction is received in a case where it is determined that the information processing apparatus is connected to the external apparatus by the second connection method.

2. The non-transitory computer-readable recording medium storing a program according to claim 1, wherein, the external device connected to the information processing apparatus is a device capable of mounting an optional device, the predetermined processing is performed by using the predetermined device information to be obtained after the instruction is received without using the predetermined device information that has been stored in the memory since before the instruction is received.

3. The non-transitory computer-readable recording medium storing a program according to claim 1, wherein, when the external device that provides the predetermined device information that has been stored in the memory since before the instruction is received differs from the external device currently connected to the information processing apparatus, the predetermined processing is performed by using the predetermined device information to be obtained after the instruction is received without using the predetermined device information that has been stored in the memory since before the instruction is received, and when the external device that provides the predetermined device information that has been stored in the memory since before the instruction is received is identical to the external device currently connected to the information processing apparatus, the predetermined processing is performed by using the predetermined device information that has been stored in the memory since before the instruction is received without obtaining the predetermined device information after the instruction is received.

4. The non-transitory computer-readable recording medium storing a program according to claim 1, further causing the information processing apparatus to transmit a job to the external device connected to the information processing apparatus, wherein the predetermined processing is processing for determining whether to perform processing for controlling not to delete the job transmitted from a job queue managed by a spooler included in the information processing apparatus until processing of the transmitted job is completed by the external device.

5. The non-transitory computer-readable recording medium storing a program according to claim 1, wherein the predetermined processing is processing for displaying information on the external device connected to the information processing apparatus on a display unit included in the information processing apparatus.

6. The non-transitory computer-readable recording medium storing a program according to claim 1, wherein the predetermined device information is ability information on the external device connected to the information processing apparatus.

7. The non-transitory computer-readable recording medium storing a program according to claim 1, wherein the predetermined device information is information indicating whether the external device to which the information processing apparatus is connected is capable of mounting an optional device.

8. An information processing apparatus connectable to an external device by one of a first connection method and a second connection method different from the first connection method, the information processing apparatus being capable of detecting that the information processing apparatus is newly connected to the external apparatus by the first connection method, by using a predetermined program, but incapable of detecting that the information processing apparatus is newly connected to the external apparatus by the second connection method, the information processing apparatus comprising:

at least one processor,
wherein the at least one processor controls:
a storage unit configured to store, in a memory, predetermined device information to be obtained from the external apparatus to which the information processing apparatus is connected;
a receiving unit configured to receive an instruction for performing predetermined processing;
a determination unit configured to perform determination processing for determining whether the information processing apparatus is already connected to the external apparatus by the first connection method or the information processing apparatus is already connected to the external apparatus by the second connection method; and
a performing unit configured to perform the predetermined processing by using the predetermined device information,
wherein the predetermined processing is performed either by using the predetermined device information that has been stored in the memory since before the instruction is received without obtaining the predetermined device information after the instruction is received or by using the predetermined device information to be obtained after the instruction is received without using the predetermined device information that has been stored in the memory since before the instruction is received, based on a determination result of the determination processing, and
wherein the predetermined processing is performed by using the predetermined device information that has been stored in the memory since before the instruction is received without obtaining the predetermined device information after the instruction is received in a case where it is determined that the information processing apparatus is connected to the external apparatus by the first connection method, and the predetermined processing is performed by using the predetermined device information to be obtained after the instruction is received without using the predetermined device information that has been stored in the memory since before the instruction is received in a case where it is determined that the information processing apparatus is connected to the external apparatus by the second connection method.

9. A control method of an information processing apparatus connectable to an external device by one of a first connection method and a second connection method different from the first connection method, the information processing apparatus being capable of detecting that the information processing apparatus is newly connected to the external apparatus by the first connection method, by using a predetermined program, but incapable of detecting that the information processing apparatus is newly connected to the external apparatus by the second connection method the control method comprising:
storing, in a memory, predetermined device information to be obtained from the external apparatus to which the information processing apparatus is connected;
receiving an instruction for performing predetermined processing;
performing determination processing for determining whether the information processing apparatus is already connected to the external apparatus by the first connection method or the information processing apparatus is already connected to the external apparatus by the second connection method; and
performing the predetermined processing by using the predetermined device information,
wherein the predetermined processing is performed either by using the predetermined device information that has been stored in the memory since before the instruction is received without obtaining the predetermined device information after the instruction is received or by using the predetermined device information to be obtained after the instruction is received without using the predetermined device information that has been stored in the memory since before the instruction is received, based on a determination result of the determination processing, and
wherein the predetermined processing is performed by using the predetermined device information that has been stored in the memory since before the instruction is received without obtaining the predetermined device information after the instruction is received in a case where it is determined that the information processing apparatus is connected to the external apparatus by the first connection method, and the predetermined processing is performed by using the predetermined device information to be obtained after the instruction is received without using the predetermined device information that has been stored in the memory since before the instruction is received in a case where it is determined that the information processing apparatus is connected to the external apparatus by the second connection method.

10. The control method according to claim 9, wherein, when the external device connected to the information processing apparatus is a device capable of mounting an optional device, the predetermined processing is performed by using the predetermined device information to be obtained after the instruction is received without using the predetermined device information that has been stored in the memory since before the instruction is received.

11. The control method according to claim 9, wherein,
when the external device that provides the predetermined device information that has been stored in the memory since before the instruction is received differs from the external device currently connected to the information processing apparatus, the predetermined processing is performed by using the predetermined device information to be obtained after the instruction is received without using the predetermined device information that has been stored in the memory since before the instruction is received, and
when the external device that provides the predetermined device information that has been stored in the memory since before the instruction is received is identical to the external device currently connected to the information processing apparatus, the predetermined processing is performed by using the predetermined device information that has been stored in the memory since before the instruction is received without obtaining the predetermined device information after the instruction is received.

12. The control method according to claim 9, further causing the information processing apparatus to transmit a job to the external device connected to the information processing apparatus,
wherein the predetermined processing is processing for determining whether to perform processing for controlling not to delete the job transmitted from a job queue managed by a spooler included in the information processing apparatus until processing of the transmitted job is completed by the external device.

13. The control method according to claim 9, wherein the predetermined processing is processing for displaying information on the external device connected to the information processing apparatus on a display unit included in the information processing apparatus.

14. The control method according to claim 9, wherein the predetermined device information is ability information on the external device connected to the information processing apparatus.

15. The control method according to claim 9, wherein the predetermined device information is information indicating whether the external device connected to the information processing apparatus is capable of mounting an optional device.

* * * * *